March 27, 1945.   A. M. GRIFFIN   2,372,485
SELF STAKING BUSHING AND THE LIKE
Filed July 16, 1942
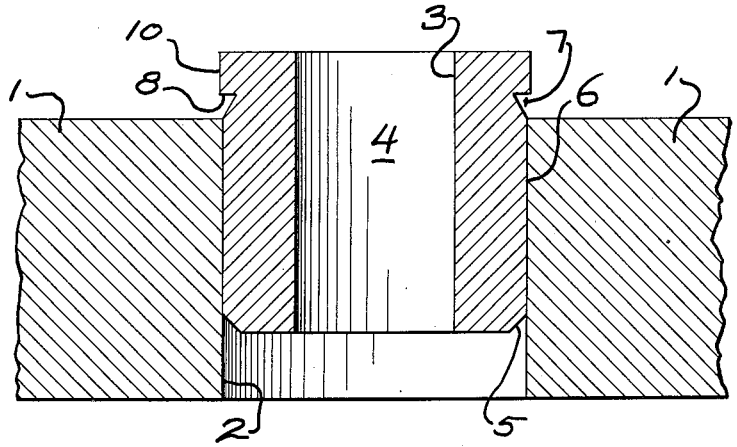
Fig. 1.
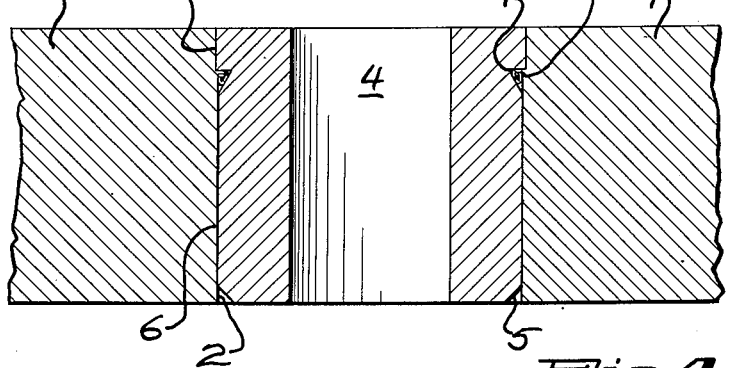
Fig. 2.
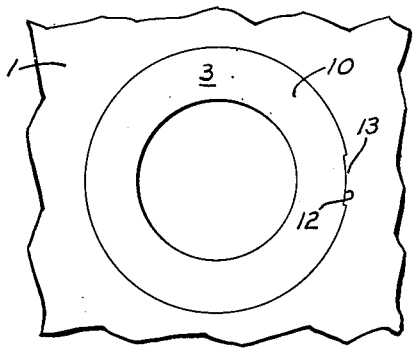
Fig. 3.
Fig. 4.
INVENTOR
ALVAH M. GRIFFIN.
BY
Lippincott & Metcalf
ATTORNEYS.

Patented Mar. 27, 1945

2,372,485

UNITED STATES PATENT OFFICE 2,372,485

SELF-STAKING BUSHING AND THE LIKE

Alvah M. Griffin, Los Angeles, Calif., assignor to Northrop Aircraft, Inc., Hawthorne, Calif., a corporation of California Application July 16, 1942, Serial No. 451,233

1 Claim. (Cl. 77—62)

My invention relates to self staking bushings and the like, and more particularly to a means and method of installing bushings or similar devices in a base member where locking is desired. My invention is applicable for the insertion and locking of any cylindrical part in a base member.

Among the objects of my invention are:

To provide a self staking cylindrical part; to provide a means and method of locking a cylindrical part in a foundation member; to provide a means and method of locking a bushing in a bore; to provide a means and method of installing drill bushings in assembly jigs and the like, and to provide a simple means and method of self staking a cylindrical part in a foundation member.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself in any way, to the apparatus of the present application, as I may adopt various other apparatus embodiments utilizing the method, within the scope of the appended claim.

In broad terms, my invention is based on the fact that when an object is pressed into a bore of similar though slightly smaller cross-section a shearing action will take place, displacing the metal around the object into a ring projecting inwardly from the sides of the bore.

My invention utilizes in one embodiment thereof, the principle of shearing action set forth above by providing on such object a portion which substantially fits a bore in a foundation member, a portion which is slightly oversize with respect to the bore, and a groove in the fitting portion into which the sheared metal may enter during insertion to lock the bushing in place thereafter. This embodiment of my invention is particularly applicable where the object is of harder material than the foundation member and will be described primarily as useful in locking hardened drill bushings in assembly jig plates.

A second embodiment of my invention is particularly applicable where the object is of softer material than the foundation member as in the installation of bronze bushings in steel or oilite bushings in foundation members of heat treated dural. In such instances, the inserted portion of the object is preferably of uniform cross-section and the wall of the bore is modified to perform the shearing function.

My invention may be more fully understood by reference to the drawing, wherein:

Fig. 1 is a diagrammatic sectional view of a hardened drill bushing partially inserted into a mild steel assembly jig plate.

Fig. 2 is a diagrammatic sectional view showing the bushing fully inserted in the plate and locked in place in accordance with my invention.

Fig. 3 is a plan view of the assembled bushing of Fig. 2.

Fig. 4 is a diagrammatic sectional view illustrating a second embodiment of my invention applicable where the object or insert is of softer material than the base or foundation member.

Ordinary press-fit bushings have a tendency to become loose and fall out during use. Furthermore, when more than a press-fit is required for locking purposes, staking and spinning operations have to be performed to lock the parts in place.

In the practice of my invention with respect to this type of assembly, and referring directly to Fig. 1, the foundation member such as, for example, a mild steel plate 1 is provided with a bore 2 therein into which a bushing or similar object 3 is to be inserted. If it is a bushing, for example, for use in drill jigs, the bushing will be provided with a central drill aperture 4. The entering outer edge of the bushing is preferably provided with a bevel 5 for ease of insertion. A substantial portion of the external surface of the lower end of the bushing as indicated by the numeral 6, is machined to substantially fit bore 2. Immediately above the fitted portion 6 of the bushing is annular groove 7, preferably having an upper planar surface 8 normal to the direction of insertion of the bushing. The remainder 10 of the peripheral outer surface of the bushing is made to be somewhat oversize in diameter with respect to the diameter of bore 2 in the foundation member 1.

To insert and lock the bushing in place, the bushing is inserted into aperture 2 along the fitted portion first and then sufficiently heavy pressure is applied to the top of the bushing to force the oversize portion 10 of the bushing into the foundation member 1. The edge between groove 8 and the oversize portion 10 forms a cutting edge engaging the wall of the bore. This cutting edge shears the metal of the bore wall and turns it into groove 7 as shown in Fig. 2 and as indicated by the numeral 11. This sheared metal is not completely separated from the foundation member 1 at its base, and with the proper relationship of the size of groove 7 with respect to the amount of metal sheared, the sheared metal can be made to substantially fill and jam in groove 7. Under these conditions the bushing is completely locked in place, unable to move in either direction, being held tightly by the sheared but still connected metal in groove 7. In this respect it will be noted that the lower surface of groove 8 does not provide a shearing edge with surface 6.

Tests have proven that locks obtained in this manner between hardened drill bushings and a mild steel foundation plate are so strong, that attempts to drive out the bushings have resulted in fracture of the bushing. Such bushings do not become loose in use, it is not necessary to hold the diameter of bore 2 to nearly an exact a press-fit as with ordinary press-fit bushings, thereby saving machining and installation time. Even though there is a tolerance between the external diameter of the smaller portion 6 of the bushing, and the interior diameter of bore 2, accurate registry is obtained, with an interlock far greater than can be obtained by a press-fit only. Furthermore no stacking or spinning is required after the bushings have once been pressed in place.

In some cases, in order to assure that the bushing or any other insert, when of circular cross-section will at no time rotate after assembly, I contemplate providing a longitudinal groove or serration 12 in the oversize portion 10 of the bushing. Thus, in assembling the bushing, that portion 13 of the foundation member 1 facing such groove or serration, will not be sheared, but will occupy the groove.

In the embodiment of my invention illustrated in Fig. 4, and applicable where the insert 3 is of softer material than the base or foundation member 1, the portion of the insert which enters the bore 2 is of uniform cross-section, while the wall of the bore is modified to incorporate an upper portion 15 of major diameter and a lower portion 16 of minor diameter, with a groove 17 adjacent the lower portion of minor diameter. The upper portion 15 is of sufficient diameter to comfortably receive the insert 3. The portion of minor diameter accordingly will be undersized so as to effect a shearing of the insert as it is pressed home into final position. As in the case of the embodiment of Figs. 1 and 2, the metal which is sheared enters the groove and locks the insert in position. The embodiment of Fig. 4 may also be provided with a longitudinal groove (not shown) in the lower portion 16 to function as the groove 12 of Fig. 3, in precluding any rotation of the assembled insert.

In the case of either embodiment described above, the relative dimensions are such as to preferably shear enough metal to fill the groove and provide a tight locking effect.

While I have described my invention in considerable detail, it is subject to further modification and alteration without departing from the principle involved, and I do not therefore wish to be limited to the exact embodiments described by me except as may be necessitated by the appended claim.

I claim:

A self-staking assembly comprising a pair of interfitting members, one of said members having a shearing edge for engaging and shearing the other member during assembly and a groove adjacent said shearing edge to receive material sheared from said other member, said shearing edge extending along only a portion of the circumference of its associated member to create a longitudinal rib and groove lock between said members during the assembling of said members.

ALVAH M. GRIFFIN.